Dec. 11, 1934. G. GUALTIEROTTI 1,984,264
CINEMATOGRAPHIC PICTURE TAKING AND PROJECTING MACHINE
Filed May 19, 1931 5 Sheets-Sheet 1

G. Gualtierotti
INVENTOR

By: Marks & Clerk
ATTYS.

Dec. 11, 1934.  G. GUALTIEROTTI  1,984,264
CINEMATOGRAPHIC PICTURE TAKING AND PROJECTING MACHINE
Filed May 19, 1931  5 Sheets-Sheet 2
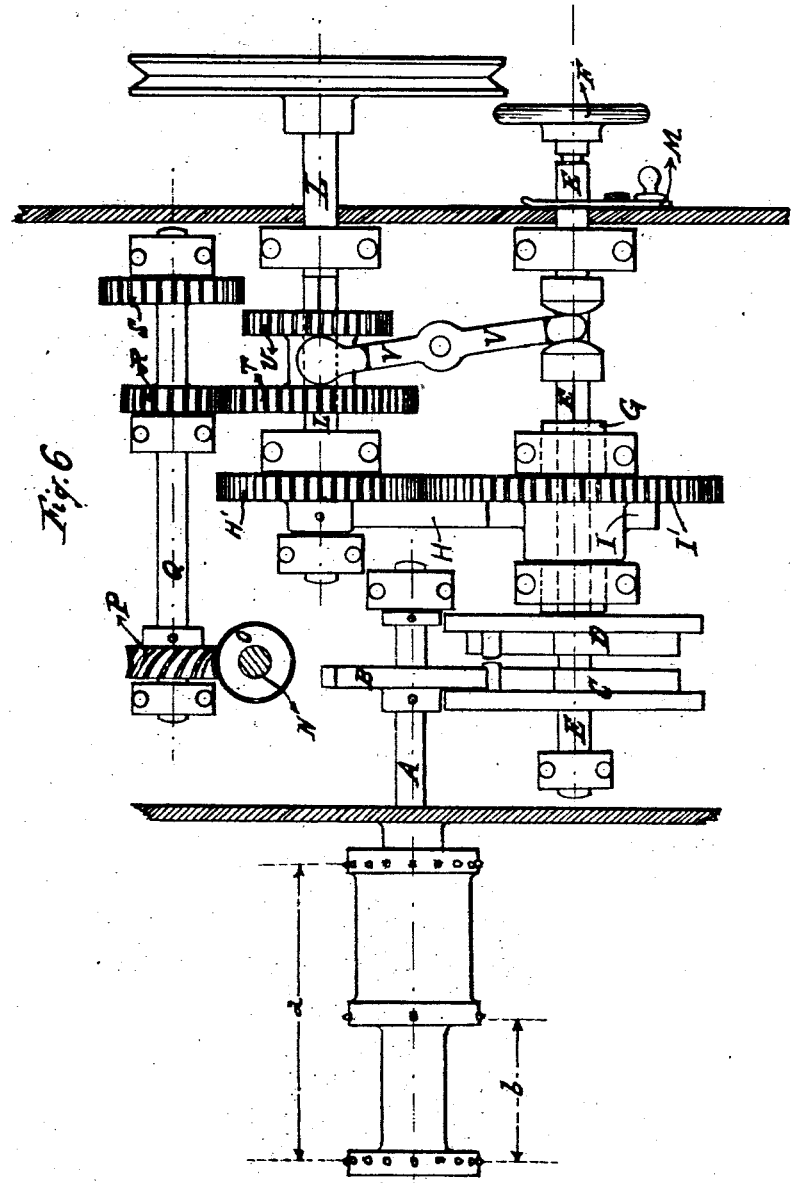
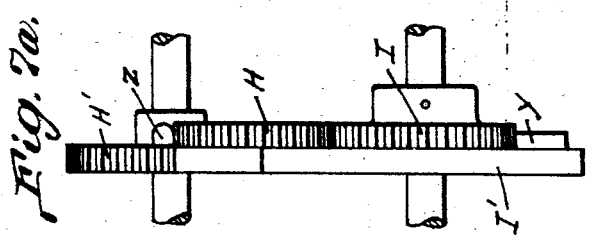
G. Gualtierotti
INVENTOR
By Marks & Clark
Attys.

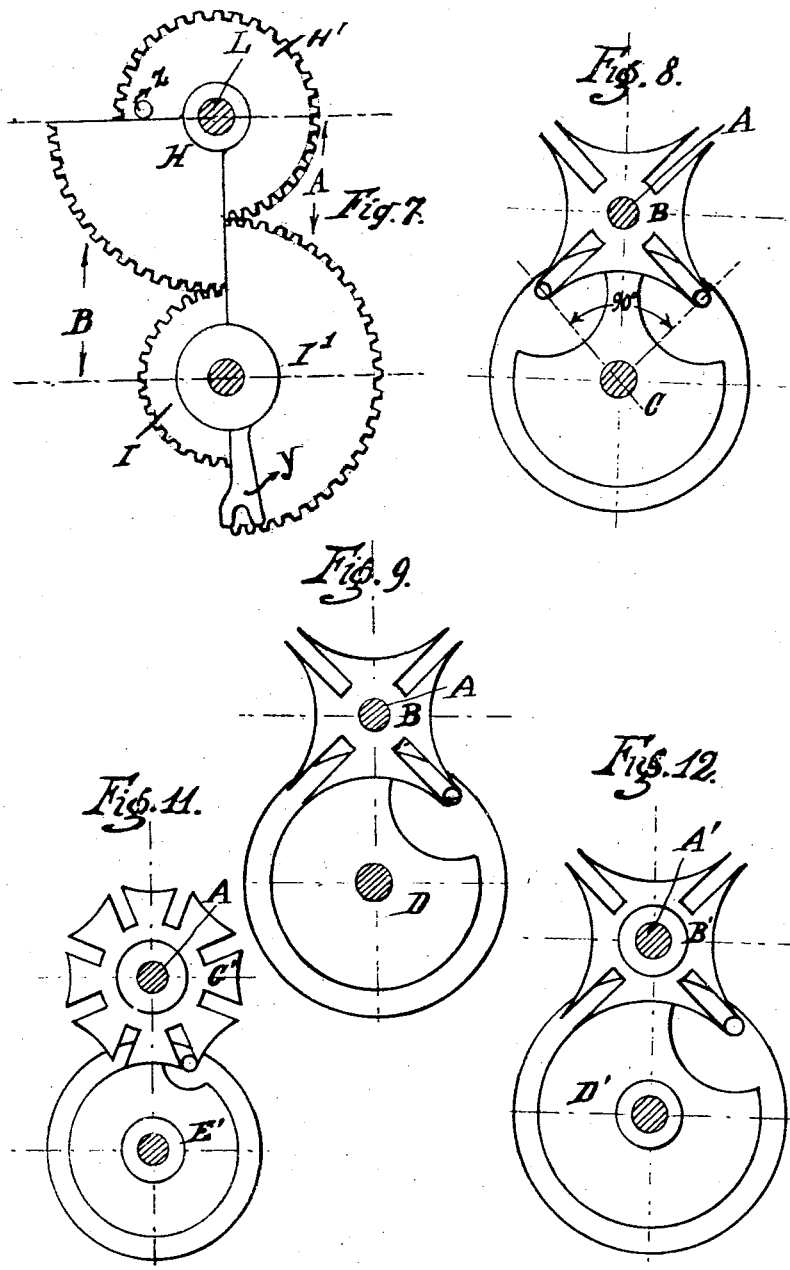

Dec. 11, 1934.  G. GUALTIEROTTI  1,984,264
CINEMATOGRAPHIC PICTURE TAKING AND PROJECTING MACHINE
Filed May 19, 1931   5 Sheets-Sheet 4

G. Gualtierotti
INVENTOR

By Marks & Clerk
ATTYS.

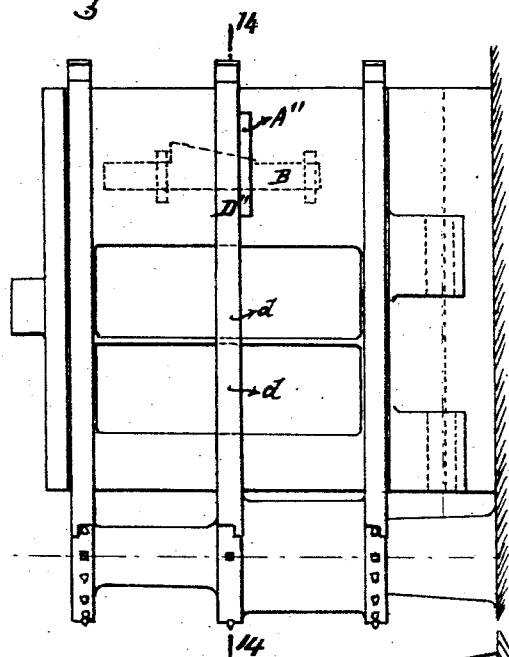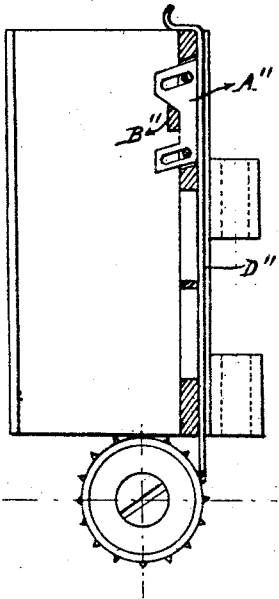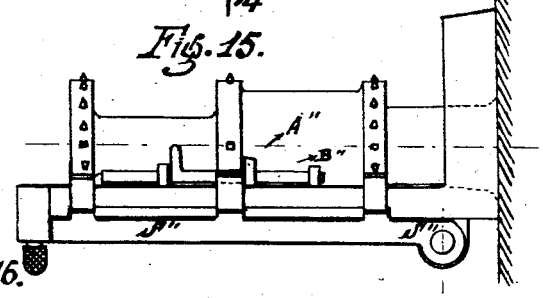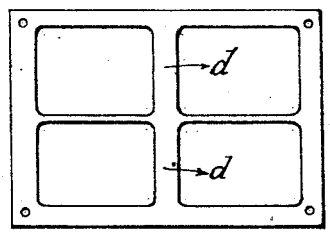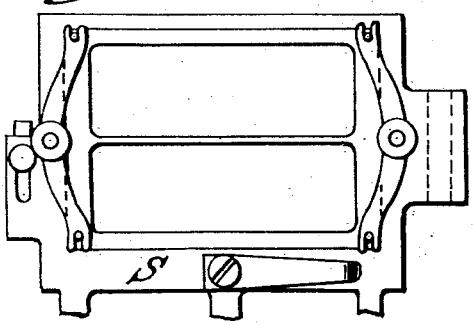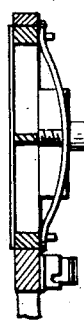

Patented Dec. 11, 1934

1,984,264

UNITED STATES PATENT OFFICE 1,984,264

CINEMATOGRAPHIC PICTURE TAKING AND PROJECTING MACHINE

Gualtiero Gualtierotti, Milan, Italy

Application May 19, 1931, Serial No. 538,580
In Italy June 16, 1930

6 Claims. (Cl. 88—18.3)

It is well known that in some systems for the reproduction of natural colours and for the obtention of stereoscopic effects in cinematography, films are employed which are wider than the standard films, and the same applies to the projection of pictures of panoramic type.

It is also well known that in some systems for the reproduction of colours by means of selective pictures, a greater velocity and amplitude is used in the stepwise advancement of the film in order to obtain the projection of the successive photograms in pairs, instead of single, and that these photograms may be of normal or panoramic width, or they may be arranged two by two side by side so as to employ films of normal width or greater than normal.

The indiscriminate use of films so varying either in size and film-travelling velocity in the present state of the picture taking and picture projecting machines would make it necessary to use as many different machines as are the film types, with the inconvenience that the plants—especially for projection theaters—would become cumbersome, expensive and unpractical.

The present invention, obviates this inconvenience by means of an improvement in cinematographic machines which permits the use of the various film types in one and the same machine.

The invention is illustrated in one of its execution forms and in a modification thereof by the accompanying drawings, in which:

Fig. 6 is a diagrammatic view of the film traction mechanism in projecting machines, improved according to the present invention.

Fig. 7 is a detail of the traction mechanism illustrated in Fig. 6, which permits to impart two different velocities to the spindle of the film traction spool during a complete revolution of the driving shaft.

Fig. 7a is a side elevational detail of the arrangement shown in Fig. 7.

Fig. 8 shows a further detail of the traction mechanism illustrated in Fig. 6, by means of which the Maltese cross is caused to perform half a revolution during a quarter revolution of the driving shaft.

Fig. 9 shows yet another detail of the traction mechanism illustrated in Fig. 6, by means of which the Maltese cross is caused to perform a quarter revolution during a quarter revolution of the driving shaft.

Fig. 11 shows a detail of the traction mechanism illustrated in Fig. 10, by means of which the Maltese cross is caused to make ⅛th of revolution during a quarter revolution of the driving shaft.

Fig. 12 is a detail of the traction mechanism illustrated in Fig. 10, by means of which the Maltese cross is caused to perform a quarter revolution during a quarter revolution of the driving shaft.

Fig. 13 is a front view showing the film-guiding corridor, the shutter being removed.

Fig. 14 is a vertical section along the line 14—14 in Fig. 13.

Fig. 15 is a plan view of Fig. 13.

Fig. 16 shows the press-shutter of the film-guiding corridor in front view.

Fig. 17 is a section along the line 17—17 in Fig. 16.

Fig. 18 is a front view of a press-frame for use in the case of films having three photograms (Fig. 4) or four photograms (Fig. 5), instead of a film having two photograms arranged side by side (Fig. 3) or a film having one panoramic photogram (Fig. 2).

The various kinds of films are considered in Figs. 1 to 5 inclusive.

Figure 1:
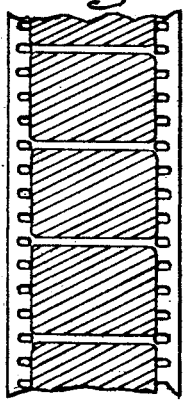
Fig. 1 shows the standard film in front view.

Fig. 1 represents the standard films at present in use, bearing standard photograms and travelling at standard speed, viz. travelling stepwise a distance corresponding to the length of a photogram at each step.

Figure 2:
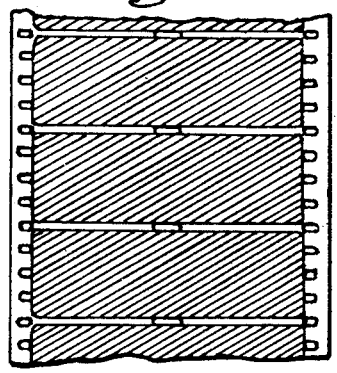
Fig. 2 shows a panoramic picture film in front view.

Fig. 2 represents the films bearing panoramic photograms, having about twice the standard width and travelling at normal speed.

Figure 3:
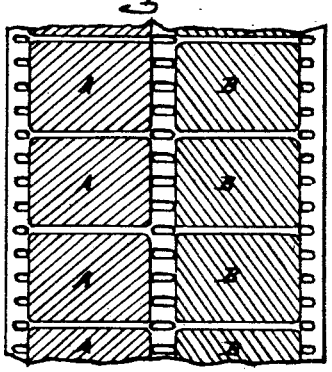
Fig. 3 is a front view showing a colour picture film with two photograms arranged side by side.

Fig. 3 represents the films for colour cinematography, with side by side photograms, having the like width and like travelling speed as the films according to Fig. 2.

Figure 4:
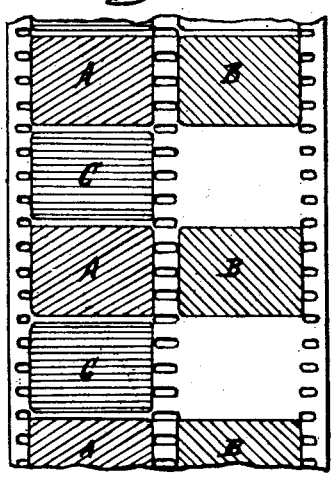
Fig. 4 is a front view of colour picture film with the photograms arranged for trichromatic synthesis.

Fig. 4 represents the films for colour cinematography according to the trichromatic system, having the same width as the films according to Fig. 3 and twice the standard travelling speed or distance travelled at each step.

Figure 5:
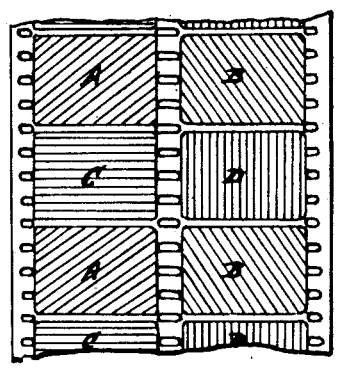
Fig. 5 is a front view showing a colour picture film with the photograms arranged for four-chromatic synthesis.

Fig. 5 represents the films for colour cinematography according to the four-chromatic system, having the same width and travelling speed as the films according to Fig. 4.

The films of the type according to Figs. 1 and 2, if used for reproduction of the natural colours on the filter selection system, must be capable of travelling at twice the standard speed, as the films according to Figs. 4 and 5.

The main improvement in the picture taking and projecting machines consists in the traction mechanism for the films, the mechanism being capable to effect the intermittent feed of the films by steps corresponding each to the height of a single photogram or to the height of two photograms. The mechanism is illustrated on Fig. 6 and is as follows:

On the spindle A of the ordinary film-pulling toothed spool, an ordinary Maltese cross B is fixed. With this cross two different pin-discs C and D can engage, the disc C carrying two pins spaced 90° and the disc D carrying a single pin as in the ordinary similar mechanisms. The two discs C and D are fixed on a common spindle E, which can be moved longitudinally in its bearings and, by means of an external button F, can be brought into either of the two positions of engagement of disc C or disc D with the Maltese cross. The spindle E is slidable inside the hollow shaft G with which it is invariably connected for rotation and from which it receives the movement imparted to the shaft G by the gear-wheel pair H—I. The speed of the driving shaft L is constant as received from a motor or from a hand crank, but the speed transmitted by the shaft L to the shaft E is variable during a revolution, and precisely as follows:

With reference to Fig. 7, the driving wheel is composed of two different superposed sectors, viz. a sector H extending through 90° and a sector H' extending through 270°, while the driven wheel is composed of two superposed sectors I and I', each of them extending through 180° but being different in diameter. The 90° sector H of the driving wheel meshes with the 180° sector I of the driven wheel with a speed ratio 1 to 2 so that, while the driving wheel makes ¼ turn, the driven wheel will make ½ turn. Accordingly the 270° sector H' of the driving wheel meshes with the 180° sector I' of the driven wheel with a speed ratio 1.5 to 1, so that while the driving wheel makes ¾ turn the driven wheel makes ½ turn. In this manner it is obtained that to each revolution of the driving shaft L (Fig. 6) there corresponds a revolution of the spindle E, but the speed of the spindle E during ¼ of its revolution is different from the speed obtaining during the other ¾, the ratio being 3 to 1. Noteworthy in this gearing is the detail shown in Fig. 7, which consists in a pin $z$ provided on the on the pitch circle of the sector H' of the driving wheel, and in a forked abutment $y$ provided on the corresponding sector I' of the driven wheel; the pin $z$ engages the forked abutment $y$, with the effect of securing and rendering regular the intermittent meshing of the two sectors.

If we now assume that the Maltese cross is engaged by the two-pin disc C (Fig. 8) so that at the beginning of the quicker movement the first pin enters the notch of the Maltese cross, during the first ¼ turn of the driving shaft L both pins will come into action, so that the Maltese cross and the spindle A will perform half a revolution; the other half revolution of the disc-carrying spindle E will be performed during the time taken by the driving shaft L to perform the remaining ¾ turn.

Instead, if we assume that the Maltese cross is engaged by the single-pin disc D (Fig. 9) and that also in this case the disc-pin begins to engage the notch of the Maltese cross at the beginning of the quicker motion during a ¼ turn of the driving shaft L, the Maltese cross and the shaft A will perform only a ¼ turn, while the spindle E will restore the disc pin into engagement position at the end of the first revolution of the driving shaft L.

In this manner, in the first instance the film engaged by the toothed spool fixed on the shaft A will travel twice the distance travelled in the second instance and, if the peripheral length of the pulling spool is the standard one of cinematographic machines, the film length travelled at each revolution will be that corresponding to two photograms in the first instance, and that corresponding to a single photogram in the second instance. In either case the starting speed is the same; only, the traction is exerted in the former case during the whole of the ¼ turn of the driving shaft, whereas in the second case it is exerted only during ⅛ turn of said shaft. As the machine shutter is designed for the standard travelling speed, that is to say so as to let the light pass during about ¾ of each revolution (more accurately, during ¾ less the angular space covered by the picture-projecting or picture-taking objective), it results that in both cases the projection duration remains the same and equal to that of the ordinary cinematographic machines.

In order to bring into engagement either the one or the other of the two discs, as already mentioned the button F fixed at the external end of the spindle E is operated so as to bring about the desired longitudinal movement of this spindle. On spindle E two circular slots are formed for engagement by the stop M in order to lock the spindle E in the desired working positions.

In accordance with the greater stroke of the film it must be possible to vary the speed of the toothed feeding spool serving to entrain the film before and after its passage through the projection shutter and through the pulling spool. These spools are endowed with a continuous rotation; just these two spools, in the first instance considered above, will run with double the speed they have in the second instance.

This is secured by the device illustrated on Fig. 6, in which N is the spindle that, by means of gear wheels, actuates the two spools. The spindle N is actuated by the helical wheel P meshing with the toothed wheel O keyed on the spindle N. The helical wheel P is keyed on a spindle Q carrying two further toothed wheels R and S.

A change-speed comprising two rigidly interconnected gear wheels T and U is adapted to slide along the driving shaft L while it is fast with the rotation thereof, and can take up two positions; in one position the wheel T drives the spindle Q across the wheel R, and in the other position the wheel U drives the spindle Q across the wheel S. In the former case the spindle Q revolves with a speed twice as great as in the latter case, because of the ratio of the wheel pairs concerned. The passage from one speed to the other is effected by sliding the wheel-set T—U by means of the lever V actuated by the spindle E, and takes place simultaneously with the variation of the speed of the spindle A and through the same longitudinal movement of the spindle E by which the speed of the spindle A is changed.

As an alternative for the film traction mechanism just described, another mechanism achieving the same results will now be described.

Figure 10:
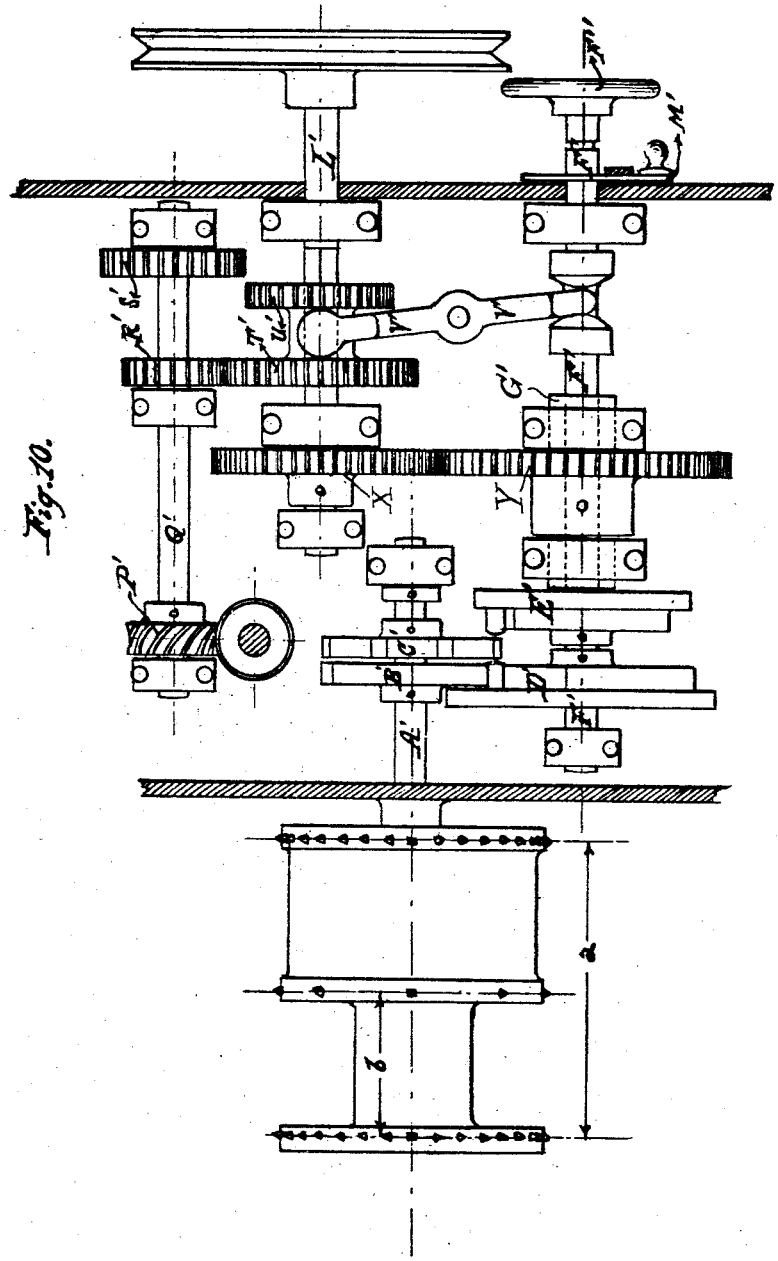
Fig. 10 shows a modified form of the traction mechanism illustrated in Fig. 6.

The second mechanism is illustrated in Fig. 10 and in this case the diameter of the film pulling toothed spool is twice that ordinarily used in cinematographic machines. In this manner, with the rotation of this spool through ¼ revolution a film stroke corresponding to two photograms will be obtained, while the film advancement by one photogram will correspond to a spool rotation through ⅛ revolution.

On the spool spindle A' two Maltese crosses B' and C' (Figs. 10 and 11) are fixed, the cross B' having four notches spaced 90° apart like the ordinary Maltese crosses, and the cross C' having eight notches spaced 45° apart. With each of these Maltese crosses a corresponding disc D' (Fig. 12) resp. E' (Fig. 11) can be brought into engagement, both discs having a single engagement-pin. These two discs are fixed on the same spindle F' (Fig. 10) and this spindle can be slid longitudinally in order to bring either the one or the other disc into engagement with the corresponding Maltese cross. In the first case the rotation imparted to the spindle A' will be ¼ turn and in the second case it will be ⅛ turn; accordingly the film will be moved forward two photograms, resp. a single photogram.

Also here the machine shutter is designed for standard feed, that is conventional gears X and Y connect the shaft L' to the spindle F' and consequently the duration of the projection remains the same.

The longitudinal movement of spindle F' is operated from the outside by the hand wheel F'' as in the mechanism previously described; a speed-changing device similar to that described in connection with Fig. 6 and controlled by the spindle F' serves to impart to the feed spools the suitable speed corresponding to the distance travelled by the film at each step.

In order to complete the adaptability of the machine to the various kinds of film it is necessary that the toothed spools, both for the continuous and for the intermittent or feeding entrainment of the film, may allow of different kinds of film engaging them. Considering as maximum standard size that of the film represented in Fig. 3 with side by side photograms, the spools shall correspond to this size and be fitted with a standard pitch toothing (viz. four holes per photogram) on each of the two end rims. Care, however, shall be taken to so arrange matters in the picture taking, printing and projecting machines that the axis of a cross pair of film holes shall coincide with the line separating each photogram from the successive one. In Figs. 6 and 10 the spool type suitable to this effect is shown. The toothed-rim distance or gauge a is intended for the maximum size just said and serves for the films of the kind illustrated by Figs. 2 to 5. The toothed-rim distance or gauge b serves for the films of ordinary size, viz. those of the kind represented by Fig. 1.

The center toothed-rim, however, has a pitch four times as great as that of the side rims, viz. corresponding to a hole every four holes. This arrangement has been adopted in order to allow for the case of a panoramic picture film being used, in which a center row of holes can be perforated only between one photogram and the next, that is to say with a pitch four times as great as the pitch of the edge perforations. The above said arrangement is sufficient for the ordinary films with standard gauge (Fig. 2), since it has been proved that the film can be satisfactorily entrained even with the hole-row of one edge only; in this case the engagement of the spools with the inner hole-row occurs only once every fourth hole, whereas the engagement with the holes of the outer hole-row occurs in the normal way. The other parts correspond to the arrangement shown in Fig. 6, the similar parts bearing corresponding but primed reference numerals.

A further modification necessary in the machines, obviously is that the window-guide in which the film is travelling shall be of such a size as to be capable of accommodating the largest film size. Such a window-guide is illustrated in Figs. 13 to 18. According to the invention, the guide must be fitted with four windows, to which correspond the films shown by the Figs. 1—3—4—5. Since, however, provision must be made also for the panoramic films of the type shown by Fig. 2, it is necessary that, as well on the fixed portion of the guide as on the shutter, the windows (which must thus be reduced to two) shall be free from the longitudinal partition. To achieve this, it has been arranged that the center partitions d—d shall make part of a separate piece D'' wedged into the guide; the piece D'' guides and supports the film. When panoramic films are employed, the piece D'' should be removed (Figs. 16 to 18), and the windows will remain free. A means is also provided for removing the longitudinal partition on the shutter S''; Fig. 16 shows the detail thereof by way of example.

For the case of a single, standard size film as per Fig. 1 a small piece is arranged at A'' on the shutter-guide, the piece being slidable in a slot formed in the guiding plate so that the said piece, when pushed towards the film and fixed by a sort of sliding guide B'', projects to the outside. In this position the piece A'', in conjunction with the ordinary stationary side-guide, forms the guiding corridor which is necessary in order that the film may travel in a regular manner in a determined position.

Having now particularly described and ascertained the nature of my said invention and in what manner the same is to be performed, I declare that what I claim is:—

1. A picture projecting machine comprising a driving shaft, a spindle, a pair of discs fixed to the spindle, one disc having a single pin thereon and the other a pair of pins thereon, a film feeding spindle having a Maltese cross fixed thereto, manually operable means for shifting the first spindle and discs in reverse directions to cause alternate engagement of the single pin or the pair of pins with the cross, and intermeshing segmental gears operably arranged between the shaft and the first spindle.

2. A picture projecting machine as claimed in claim 1, wherein one of the segmental gears is fixed to the driving shaft, and the other segmental gear is slidably and non-rotatably mounted on the shiftable spindle so that it remains in mesh with the first segmental gear during the shifting of the spindle.

3. A picture projecting machine as claimed in claim 1, and in combination therewith a film take-up spool, a speed changing gearing between the driving shaft and the film take-up spool, and an operable connection between the speed changing gearing and the shiftable spindle to cause operation of the speed changing gearing simultaneously with the shifting of the spindle.

4. A picture projecting machine as claimed in claim 1, wherein each of the segmental gears is composed of two different superimposed sectors, a pin provided on the pitch circle of one sector of the gear on the driving shaft, and a forked abutment provided on the corresponding sector of the other gear and engaged by the pin to effect regular intermittent meshing of the sectors.

5. In a picture projecting machine, the combination with its film take-up spools of a driving shaft, a film feeding spindle having a film engaging spool thereon, engaging means on said spindle including at least one Maltese cross, a second spindle having a pair of discs fixed thereon and disposed on opposite sides of the Maltese cross and provided respectively with at least one pin, intermeshing gearing between the driving shaft and the second spindle, a speed changing device, means for shifting the disc bearing spindle to alternately cause engagement of the pin on either disc with the engaging means on the spindle and to simultaneously actuate the speed changing device.

6. A picture projecting machine as claimed in claim 5, wherein the engaging means includes a pair of Maltese crosses mounted on the film feeding spindles, one of the crosses being provided with four notches spaced 90° apart while the other is provided with eight notches spaced 45° apart.

GUALTIERO GUALTIEROTTI.